United States Patent [19]

Finger et al.

[11] 3,912,781
[45] Oct. 14, 1975

[54] 1-HYDROXYMETHYL-1,2,3,4-TETRAHYDROFLUORANTHENE

[75] Inventors: Carl Finger, Castrop-Rauxel; Heinz-Gerhard Franck, Duisburg-Meiderich; Johannes Turowski, deceased, late of Castrop-Rauxel, by Else Paula Maria Turowski nee Hinz, heir, Castrop-Rauxel; Maximilian Zander, Castrop-Rauxel, all of Germany

[73] Assignee: Rutgerswerke Aktiengesellschaft, Frankfurt am Main, Germany

[22] Filed: Oct. 24, 1972

[21] Appl. No.: 298,203

Related U.S. Application Data

[63] Continuation of Ser. No. 37,052, May 13, 1970, abandoned.

[30] Foreign Application Priority Data

June 24, 1969 Germany............................ 1931946

[52] U.S. Cl.......... 260/618 F; 260/563 P; 424/325; 424/330
[51] Int. Cl.².......................................... C07C 33/06
[58] Field of Search................................. 260/618 F

[56] References Cited
UNITED STATES PATENTS

| | | |
|---|---|---|
| 2,513,487 | 7/1950 | Hoffmann et al. ...... 260/567.6 M X |
| 2,818,440 | 12/1957 | Rust et al........................ 260/617 R |
| 3,213,155 | 10/1965 | Schriesheim et al............ 260/635 P |

OTHER PUBLICATIONS

Tucker et al., "Chemical Reviews," Vol. 50, pp. 483 and 501, (1952).

*Primary Examiner*—Paul M. Coughlan, Jr.
*Assistant Examiner*—D. B. Springer
*Attorney, Agent, or Firm*—Jerry Cohen; Charles Hieken

[57] ABSTRACT

A new compound 1-hydroxymethyl-1,2,3,4-tetrahydrofluoranthene is prepared by reacting 1,2,3,4-tetrahydrofluoranthene with paraformaldehyde in a polar solvent, in the presence of a catalytic amount of a strong base at a temperature in the range of 0 – 30°C. The 1-hydroxymethyl-1,2,3,4-tetrahydrofluoranthene is separated from the reaction mixture e.g. by precipitating it with water.

The new compound can be utilized for the preparation of various pharmacologically active substances.

1 Claim, No Drawings

1-HYDROXYMETHYL-1,2,3,4-TETRAHYDROFLUORANTHENE

This application is a continuation of Ser. No. 37,052, filed May 13, 1970, now abandoned.

This invention relates to 1-hydroxymethyl-1,2,3,4-tetrahydrofluoranthene corresponding to the structural formula I:

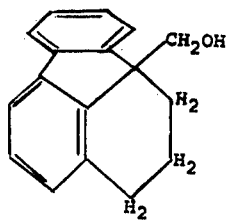

and a process for preparing it.

This compound which has not been known thus far, is obtained according to the present invention by the hydroxymethylation of 1,2,3,4-tetrahydrofluoranthene in high yield and high purity. According to the invention 1,2,3,4,-tetrahydrofluoranthene is reacted with paraformaldehyde, in pyridine, quinoline or other aprotic polar solvents, in the presence of catalytic amounts of a strong base, at room temperature in the absence of air and gives a yield of compound I of about 95%.

According to another embodiment of the invention dimethylsulfoxide (DMSO) is used as the reaction medium. Thereby, compound I is obtained in the form of its monoadduct with DMSO with a yield of about 70%. This adduct can be converted into a product free from DMSO, by heating under vacuum.

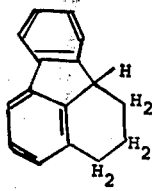 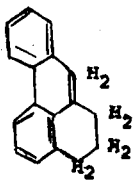

1-Hydroxymethyl-1,2,3,4-tetrahydrofluoranthene forms, from petroleum ether or methanol/water, colorless crystals, having a melting point of 85°C.

Elementary analysis: Calculated: C:86.41; H:6.82. Found: C:86.53; H:7.19.

Its monoadduct with DMSO melts at 112° to 113°C.

Elementary analysis: Calculated: C:72.58; H:7.05 S:10.20. Found: C:72.67; H:6.72 S:10.04.

The structure of compound I was determined by chemical and spectroscopic methods. It has been proven by the mode of formation, the elementary analysis and the ring-extension upon heating with phosphoric acid, whereby the known compound 1,10-trimethylenephenanthrene(III) is formed.

The product of the invention is capable of various reactions and can be utilized in the preparation of pharmacologically active substances, for example β-phenylethylamine derivatives of the general structural formula

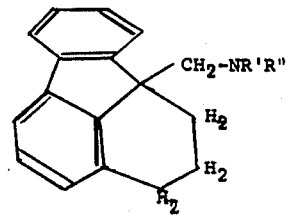

In the above formula IV R' and R" may stand for H, aryl or aralkyl radicals.

As examples of the many-sided possibilities of reactions with compound I the following are mentioned: Esterifications with acetic anhydride, formic acid, toluylsulfonylchloride, thionylchloride and phenylisocyanate as well as the above mentioned ring extension to the 1,-10-trimethylenephenanthrene, which is difficult to obtain by other reactions (See E. Clar, "Polycyclic Hydrocarbons", 1964, Vol.2, page 394). All of these reactions take place quantitatively and can be carried out easily.

The following Examples describe by way of illustration and without limitation two processes for preparing the compound, 1-hydroxymethyl-1,2,3,4-tetrahydrofluoranthene (I).

EXAMPLE 1

Ten parts by weight of 1,2,3,4-tetrahydrofluoranthene are dissolved in 15 parts by weight of pyridine and 1.6 parts by weight of paraformaldehyde are added. Subsequently, at 10°C., after rinsing with nitrogen, 0.1 parts by weight of benzyl trimethyl ammoniumhydroxide are added. After 2 hours, 0.2 parts by weight of glacial acetic acid are added, the product is mixed with water and filtered off. 1-Hydroxymethyl-1,2,3,4-tetrahydrofluoranthene having a melting point of 83° to 85°C. is thus obtained in a yield of 97% of the theory.

EXAMPLE 2

Ten parts by weight of 1,2,3,4-tetrahydrofluoranthene are dissolved in 100 parts by weight of dimethylsulfoxide. Then 1.6 parts by weight of paraformaldehyde are added and, after rinsing with nitrogen, 0.1 part of 2N-ethanolic KOH-solution is added. As soon as the crystallization is terminated, the product is filtered off and is recrystallized from 40 parts of petroleum ether (50/75). An adduct of 1-hydroxymethyl-1,2,3,4-tetrahydrofluoranthene with 1 mol of crystal-dimethyl-sulfoxide having a melting point of 112° to 113°C. is thus obtained in a yield of 70% of the theory. This adduct is separated at 95°C. and 15 Torr and 1-hydroxymethyl-1,2,3,4-tetrahydrofluoranthene having a melting point of 85°C. obtained.

In carrying out the process of the invention, 1 mol of 1,2,3,4-tetrahydrofluoranthene is dissolved in 3.8 to 5.0 mol of pyridine, quinoline or other aprotic polar solvent, for example dimethylformamide, and to the solution 1.05 to 1.1 mol of paraformaldehyde are added. Or 1 mol of 1,2,3,4-tetrahydrofluoranthene are dissolved in 1000 to 2500 parts dimethylsulfoxide and to the solution 1.05 to 1.1 mol of paraformaldehyde are added in order to obtain the adduct of 1 mol of 1-hydroxymethyl-1,2,3,4-tetrahydrofluoranthene with 1 mol of dimethylsulfoxide.

Instead of the catalytic amounts ot the strong bases used in the above Examples 1 and 2, equivalent amounts of other strong bases, for example sodium or potassium hydroxide, can be used. In carrying out said Examples, nitrogen is passed through the reaction vessel until the air is removed from said vessel. The product obtained by the process of the invention has a purity of 95 to 99 % and said process is carried out at a temperature in the range of about 0° to 30°C. The reaction is completed in about 1/2 to 2 hours. The new compound of the invention can be recrystallized preferably from a mixture of methanol and water in the proportion of about 9. to 10. The parts and % stated herein are by weight, if not otherwise stated.

What is claimed is:

1. The compound 1-hydroxymethyl-1,2,3,4-tetrahydrofluoranthene corresponding to the structural formula

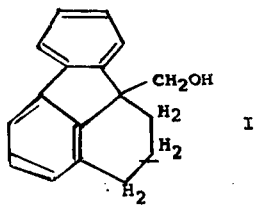

* * * * *